United States Patent [19]

Morton

[11] Patent Number: 4,905,081
[45] Date of Patent: Feb. 27, 1990

[54] METHOD AND APPARATUS FOR TRANSMITTING AND RECEIVING 3D VIDEO PICTURES

[75] Inventor: David H. Morton, Oxted, United Kingdom

[73] Assignee: British Broadcasting Corporation, London, England

[21] Appl. No.: 118,217

[22] Filed: Nov. 6, 1987

[30] Foreign Application Priority Data

Nov. 6, 1986 [GB] United Kingdom ............... 8626527

[51] Int. Cl.[4] .................... H04N 13/00; H04N 7/12
[52] U.S. Cl. .................................. 358/88; 358/135; 358/92
[58] Field of Search .................. 358/88, 89, 90, 91, 358/92, 3, 133, 135, 105; 364/522, 521

[56] References Cited

U.S. PATENT DOCUMENTS

| | | |
|---|---|---|
| 3,674,921 | 7/1972 | Goldsmith . |
| 4,541,007 | 9/1985 | Nagata . |
| 4,704,627 | 11/1987 | Yuyama et al. ............... 358/88 |
| 4,709,265 | 11/1987 | Silverman et al. ........... 358/88 X |
| 4,743,965 | 5/1988 | Yamada et al. ............... 358/88 |

FOREIGN PATENT DOCUMENTS

| | | |
|---|---|---|
| 204006 | 12/1986 | European Pat. Off. . |
| 3229859 | 2/1984 | Fed. Rep. of Germany . |
| 0037993 | 3/1982 | Japan ............... 358/88 |
| 2188510 | 9/1987 | United Kingdom . |
| WO87057 | 9/1987 | World Int. Prop. O. . |

Primary Examiner—James J. Groody
Assistant Examiner—Victor R. Kostak
Attorney, Agent, or Firm—Robert F. O'Connell

[57] ABSTRACT

Transmission of video pictures containing depth information is achieved by taking video signals from two sources, showing different representations of the same scene, and correlating them to determine a plurality of peak correlation values which correspond to vectors representing depth information. The first video signal is divided into elementary areas and each block is tested, pixel by pixel, with each vector to see which vector gives the best fit in deriving the second video signal from the first. The vectors which give the best fit are then assigned to their respective areas of the picture and constitute difference information. The first video signal and the assigned vectors are then transmitted in parallel. The first video signal can be received as a monoscopic picture, or alternatively the vectors can be used to modify the first signal to form a display containing depth.

13 Claims, 3 Drawing Sheets

METHOD AND APPARATUS FOR TRANSMITTING AND RECEIVING 3D VIDEO PICTURES

BACKGROUND OF THE INVENTION

This invention relates to the transmission of video pictures which contain depth information, and in particular to such a system which retains compatibility with monoscopic receivers.

Despite the recent advances in the field of higher definition, television cannot be a "window on the world" until it is able to convey some degree of depth information. Attempts have been made to transmit red/green anaglyph pictures to give a stereoscopic display, but this has resulted in complaints from viewers who do not possess the requisite spectacles. Clearly any attempt to transmit threedimensional (3D) pictures, must, to be practicable, transmit compatible monoscopic pictures.

The highest quality method of 3D image reproduction is represented by the hologram. It is, however, of little use to the broadcaster, requiring the illumination of the scene with at least partially coherent light or, if image scaling is required, microwaves or X-rays (depending on the direction of scaling). Even if the problems of image scaling could be overcome by some form of signal processing, the phenominal bandwidth of a "raw" hologram, of the order to 100 Gbit/s, would present considerable problems of redundancy removal, channel coding and transmission. Nevertheless, as a display the hologram is unsurpassed, conveying an air of realism far beyond that achievable with other methods.

Stereoscopy on the other hand is relatively simple to handle, using available light, and requiring only twice the original bandwidth even if no attempt is made at redundancy removal. It is also amenable to bandwidth reduction. So stereoscopy is the best choice for both studio and transmission. Where steroscopy does not excel is in the display, since most systems require polarising glasses and the picture is unwatchable without them.

U.S. Pat. No. 3,674,921 describes a method of transmitting a stereoscopic signal over a reduced bandwidth by transmitting a monoscopic signal and a difference signal. The difference signal, of 0.5MHz bandwidth, is derived from the high frequency difference between two source signals. Most of the stereoscopic information is concentrated in the high frequency areas of the difference signals, but even by transmitting only this part of the difference signal, information not necessary to stereoscopic reception is transmitted, and further bandwidth reduction is difficult.

SUMMARY OF THE INVENTION

The present invention provides a method of transmitting video pictures which contain depth information. Signals from at least two sources are provided, each signal being derived from a different representation of the same scene. The signal from a first source is correlated with the signals from each other source to give a plurality of peak correlation values which relate to vectors representative of depth information. Each elementary area of the picture is tested with each vector to find which gives the best fit in terms of deriving one picture from another. The vector which gives the best fit is assigned to the corresponding area of the picture. The signal from the first source is then transmitted and the derived vectors are transmitted as difference information indicating how the first signal needs to be changed to form a display containing depth.

The invention also provides apparatus to implement the above method.

BRIEF DESCRIPTION OF THE DRAWINGS

A preferred embodiment of the invention will now be described by way of example with reference to the drawings, in which.

DESCRIPTION OF A PREFERRED EMBODIMENT

Figure 1:
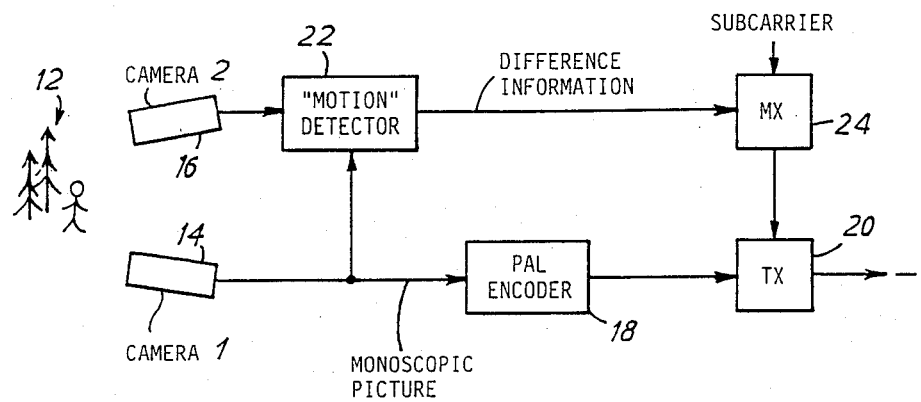
FIG. 1 is a block schematic diagram of a transmitter and receiver embodying the invention.
Figure 1:
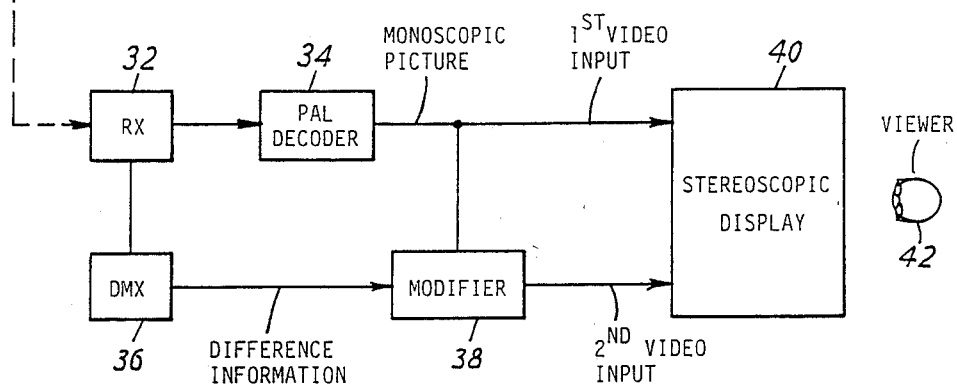

While this embodiment is described in terms of the PAL television system, the invention is equally applicable to other systems such as N.T.S.C., M.A.C., or digitally-assisted TV systems.

The transmitter 10 has two cameras for viewing a scene 12, namely camera 1 referenced 14 and camera 2 referenced 16. The output of camera 1 is taken as the main or monoscopic picture and is applied to a PAL encoder 18 and transmitter circuits 20. The output of camera 2 is compared in a circuit 22 with the output of camera 1 to provide a signal carrying information as to the differences between the two camera outputs. This difference information is modulated on a subcarrier inn a modulator 24 and applied to the transmitter circuits 20. The output of the transmitter thus forms the input to the transmission link 28.

One or many stereoscopic receivers 30 receive the transmitted signal in receiver circuits 32 which apply the main PAL-encoded signal to a PAL decoder 34. The subcarrier signal is supplied to a demodulator 36 which thus provides the difference information transmitted to a modifier 38. The modifier receives the monoscopic video output from the PAL decoder 34 and uses the difference signal to regenerate from it the output of camera 2 at the transmitter. The two video signals now available are applied respectively to the first and second video inputs of a stereoscopic display 40 viewed by a viewer 42 who is wearing stereoscopic glasses.

The circuit 22 at the transmitter is constituted by a "motion" detector of the type described in our British patent application No. 2188510A.

Figure 2:
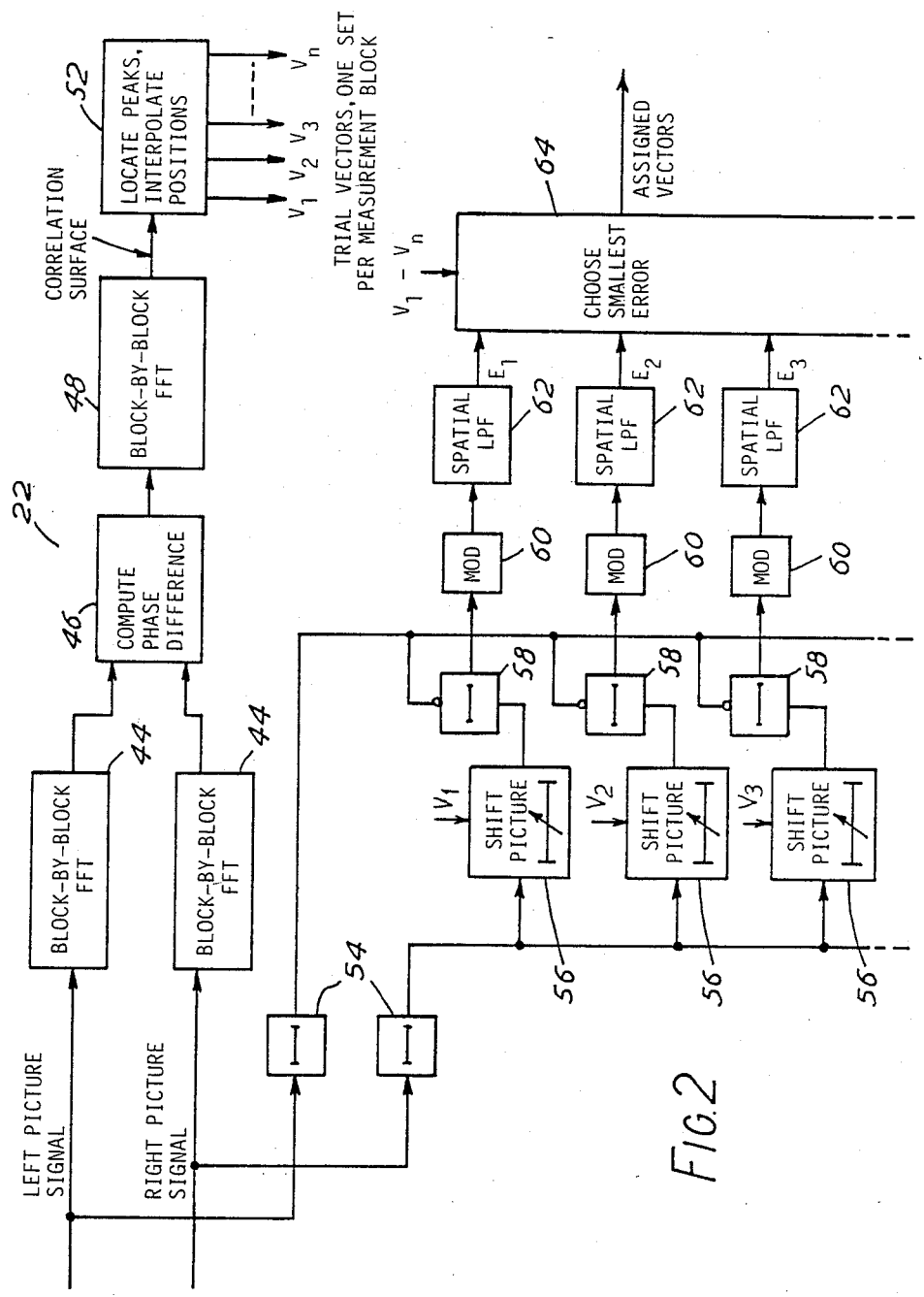
FIG. 2 is a block diagram of the "motion" detector circuit used in the embodiment of the invention and FIG. 3 is a modification of the transmitter and receiver of FIG. 1 showing how they may be used with a remotely controlled robot.

A block diagram of the circuit 22 is shown in FIG. 2. This circuit operates in two stages. In the first stage, inputs from the left and right cameras, 1 and 2 of FIG. 1, are applied to two parallel block-by-block FFT (Fast Fourier Transform) circuits 44. These compute the two-dimensional Fast Fourier Transforms of the luminance components of the two input signals. A phase difference computation circuit 46 receives the outputs of the two block-by-block FFT circuits. The output of this circuit 46 is an array of unit length vectors whose phase angle is equal to the differences in the phases in the two pictures for each spatial frequency component in the transforms.

This resulting complex array of vectors is then applied to a further block-by-block FFT circuit 48 which effectively performs a reverse FFT on the vectors. The resultant output 50 is an array of real numbers which corrrespond to the correlation surface between the two pictures. A searching circuit 52 locates the peaks in the correlation surface and produces a set of trail "motion" or "depth" vectors $V_1$ to $V_n$ corresponding to the differences between the two pictures in terms of relative movement or relative depth of the scene in the output of camera 2 as compared to camera 1.

The second stage involves trying out each of these possible vectors on every pixel (picture element) and assigning the inventor that gives the best fit. The left and right picture signals pass through a pair of compensating delays 54 to resynchronise them with the depth vectors. The left and right signals then enter a bank of identical circuits which also have inputs receiving the depth vectors $V_1$ to $V_n$ respectively.

In each of these circuits the right picture signal is the input to a shift picture circuit 56 which shifts the picture by an amount proportional to the respective depth vector $V_i$. A subtractor 58 then computes the difference between the shifted right picture signal and the unshifted left picture signal by subtracting the left picture signal from the shifted right picture signal.

The outputs of each substractor are modulated by modulators 60 and then pass through low pass filters 62 to produce a set of errors $E_1$ to $E_n$ corresponding to the result of the depth vectors $V_1$ to $V_n$. A microprocessor 64 then finds the smallest error for each picture element and assigns the depth vector which produced that error to that picture element.

These operations need not be done on the picture as a whole. It is possible to divide the picture up into blocks and operate on each block separately, each block typically being 64 by 64 pixels.

To explain the function of the circuit 22 in more detail when used to derive a difference signal for stereoscopic transmissions, we must first consider the discrete 2-dimensional Fourier transforms, Ghd 1 and $G_2$ derived from the two input signals of the two camera images. The complex array Z is calculated at every spatial frequency (m,n) from $g_1$ and $G_2$, using, $$z(m,n) = \frac{G_1(m,n)G_2(m,n)^*}{G_1(m,n)G_2(m,n)^*}$$

The phase correlation is given by the inverse Fourier transform of Z, which will only have real components.

The resulting phase correlation array can be thought of as a surface whose height at a particular point (x,y) is proportional to how well the two images correlate when the relative displacement between them is (x,y). In the case of a simple shift between the two pictures, as in this application with two non-parallel camera inputs, the correlation surface would be a delta function centered on the shift vector. The idea is that there be a peak in this surface fo each dominant depth vector in the scene. Measuring these depth vectors involves hunting for large peaks in the surface. The relative heights of the peaks will reflect the relative depths of the objects. The main novel feature of this method is to look for several peaks rather than just one, thereby allowing the detection of many depth vectors in one operation.

To measure the depth vectors to sub-pixel accuracy it is necessary to perform some interpolation on the correlation surface.

In order to measure as many of the depths present in a scene as possible, it helps to divide the picture up into blocks, rather than to perform correlations on whole pictures. This is because the number of individual peaks that can be detected accurately is limited by noise to about 3 peaks per block. In addition, it is only possible to resolve depth peaks if they are separated by a shift vector greater than about one pixel per field period. The block size would be large compared with the largest shifts that are expected, as the technique cannot correlate objects that are in different blocks in the two pictures. A size of 64 by 64 pixels is convenient. If on the other hand, it is only necessary to measure the few most significant depth vectors, then it may be as well to transform whole pictures, or at least very large blocks. It should be remembered that this division into blocks is only made for the purpose of measuring depth vectors; the vectors are still assigned on a pixel-by-pixel basis.

The first stage of the process gives us a set of depth vectors that are present in the scene but tells us nothing about which parts of the scene are at each depth. The second stage involves "trying out" each possible vector on every pixel, and assigning the vector that gives the best "fit". In situations where depth information is required on a block-by-block basis (for example a block based bandwidth compression system), there would be no need to assign a vector each pixel, and the assignment would be done on a block basis.

For every detected vector, an "error surface" is formed by calculating the modulus difference between the two input pictures when shifted by the depth vector under consideration. Areas of the two pictures that match well will produce low errors and it is reasonable to assume that these areas correspond to an object with this particular depth vector. It is preferable to perform some sort of spatial filtering on the error surface in order to reduce the effects of noise.

If the depth vectors are being measured to sub-pixel accuracy, it will be necessary to use some sort of spatial interpolator when calculating the error surface.

Once all the depth vectors measured in the first stage have been tried, each pixel is asigned the depth vector which gave the smallest error value. A threshold error level could be set, defining the maximum acceptable error level. Pixels whose errors are above this level with every trial vector could be flagged as "depth unknown". Such pixels would probably correspond to areas of edges information seen by only one of the two cameras.

If the depth vectors were measured by transforming the input pictures in blocks rather than as a whole,then it is only worth trying vectors measured in the neighbourhood of the pixel under consideration. The chances are that most pixels could have the correct vector assigned to them merely by considering the vectors measured in the block containing the pixel. Ideally the vectors measured in the immediately surrounding blocks should be tried as well, particularly for pixels near the edge of blocks. This is important in situations where a small part of an object is in adjacent blocks for the two camera images.

Thus the main signal is transmitted as monoscopic video. The difference information comprises depth and edges information. The two images of the stereoscopic signal are correlated, as just described, and the vector assignment function of the method is depth assignment. What was the uncovered background in the motion detector of our earlier application is now edge information seen by only one of the two cameras.

The difference signal in the form of depth and edges is suitable for bandwidth reduction. This may take the form of filtering and subsampling, as well as non-linear quantisation as a function of depth and luminance value since the eye's accuracy at judging depth diminishes as the depth increases, and as the luminance level falls. The difference signal can be coded as a data channel, or as a subcarrier in more conventional transmission systems, as illustrated.

In an ideal world the mono-scopic signal would be some form of sum, to complement the difference signal. This approach may well be unsuitable however, as it will leave the mono viewer watching a signal which is always interpolated from the left and right signals. Almost certainly this would be less acceptale than the transmission of one of the original left or right signals as a compatible monoscopic signal.

The stereoscopic signal is not good for the purposes of display. By coding the stereo signal as mono, and depth and edges however, the display options are left open. The display can be stereoscopic, possibly requiring glasses to view it, but achievable using present day technology. Ultimately a computer in the display could calculate the phase and amplitudes required to produce a hologram in real time. Sucha hologram would only have lateral stereoscopy unless more cameras, corrrelators and transmission bandwidth were used, but this should normally suffice.

If a vertical component of the stereoscopy was required then a third camera and extra correlation would be necessary.

Thus it is seen that the phase correlation algorithms developed for motion following can be directly applied to the problem of stereoscopic transmission. The hardware designed for motion following will therefore be equally appropriate. Using these techniques a signal can be sent which is compatible with monoscopic displays, by sending the stereo information in an data channel or on a subcarrier. The stereo information can be decoded into a stereogram now, with the option of holographic display 41 in the future.

Figure 3:
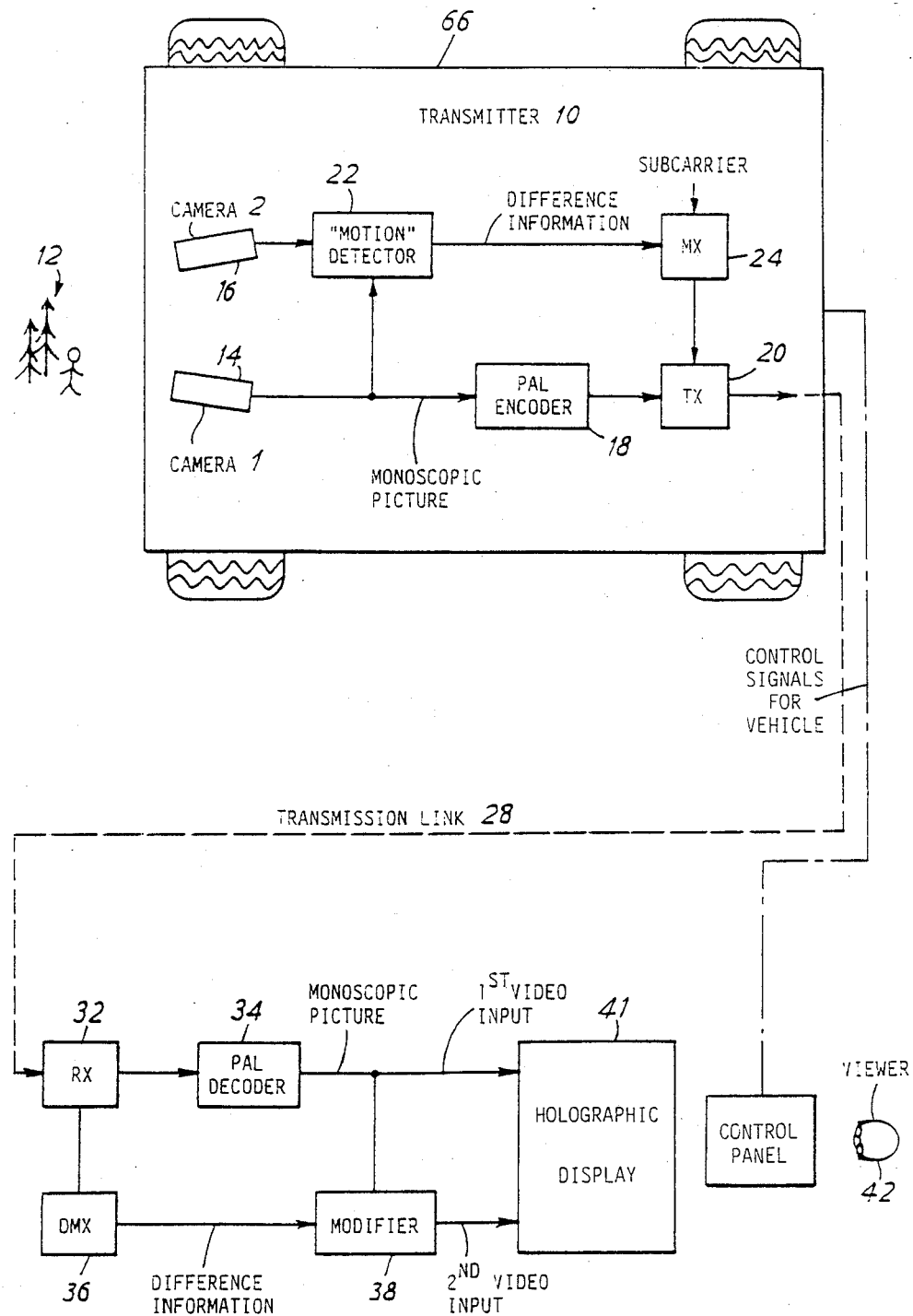

The above method could also be used as a remote sensing technique for use with robots. Robots in hazardous environments often use stereoscopic television to relay a view of their surroundings to the operator. A robot using the technique is shown in FIG. 3. The technique described could be used to derive and display the distance of an object from a robot conventional techniques known to the art and would thus avoid the need for a separate radar or ultrasonic rangefinder. The bandwidth of the system would also be reduced.

I claim:

1. A method of transmitting video pictures containing depth information, comprising the steps of:
    providing video signals from at least two sources, the signals being derived from different representations of the same scene;
    correlating the video signal from a first source with the video signal from each other source to determine a plurality of peak correlation values corresponding to vectors representing depth information;
    testing for each pixels in the pictures which of these vectors gives the best fit in deriving one of the pictures from the other;
    assigning each pixel to that vector which gives the best fit;
    transmitting the video signal from the first source; and
    transmitting the derived vectors for each pixel as difference information indicating how the first signal needs to be changed to form a display containing depth.

2. A method according to claim 1 in which the correlation of the video signal from the first source with the video signal from each other source comprises the steps of:
    calculating 2-dimensional fast Fourier transforms of the luminance components of the two signals;
    calculating the phase difference between each frequency component in the first signal and the corresponding frequency component in a parallel signal to produce a complex array of unit length vectors; and
    calculating the inverse fast Fourier transform of the said array to produce a phase correlation array for the two signals.

3. A method according to claim 1 in which the difference information is transmitted on a subcarrier.

4. A method according to claim 1 in which the difference information is transmitted in a digital data channel.

5. A method according to claim 1, in which the difference information indicates how a monoscopic picture needs to be changed to form at least one second picture so as to constitute the second picture of a stereoscopic pair.

6. A method according to claim 1, in which the difference information includes edge information.

7. A method according to claim 1, in which the difference information is subjected to bandwidth reduction by reducing the information transmitted in dependence upon image depth and/or luminance level.

8. Apparatus to transmit video pictures containing depth information comprising:
    input means to receive video signals from at least two sources the signals being derived from different representations of the same scene;
    means for correlating the video signal from a first video source with the video signal from each other source to determine a plurality of peak correlation values corresponding to vectors representing depth information;
    means for testing for each pixels in the picture which of the vectors gives the best fit in deriving one picture from the other;
    means to assign to each pixel that vector which gives the best fit; and
    transmitter means to transmit the video signal from the first source, and to transmit the said vectors as difference information indicating how the first signal needs to be changed to form a display containing depth.

9. Apparatus according to claim 8 in which the correlation means comprises:
    means for calculating the fast Fourier transforms of the luminance components of the input signals;
    means for calculating the phase difference between each frequency component in the first signal and the corresponding frequency component in a parallel signal to produce a complex array of unit length vectors; and means to calculate the inverse fast Fourier transform of the said array to produce a phase correlation arrray for the two signals.

10. A method of transmitting video picures containing depth information, comprising the steps of:

providing video signals from at least two sources, the signals being derived from different representations of the same scene;

calculating 2-dimensional fast Fourier transforms from the luminance components of the two signals;

calculating phase differences between each frequency component in the first signal and the corresponding frequency component in a parallel signal to produce a complete array of unit length vectors; and calculating an inverse fast Fourier transform of the said array to produce a phase correlation array for the two signals, the values in the array corresponding to vectors representing depth information;

testing for each of a plurality of elementary areas of the pictures which of these vectors gives the best fit in deriving one of the pictures from the other;

assigning each picture area to that vector which gives the best fit;

transmitting the video signal from the first source; and transmitting the derived vectors for each elementary area as difference information indicating how the first signal needs to be changed to form a dislay containing depth.

11. In a system for transmitting video pictures containing depth information and having a transmitter comprising:

Input means to receive video signals from at least two sources, the signals being derived from different representations of the same scene;

means for correlating the video signal from a first video source with the video signal from each other source to determine a plurality of peak correlation values corresponding to vectors representing depth information;

means for testing for each pixels in the picture which of the vectors gives the best fit in deriving one picture from the other;

means to assign to each pixel that vector which gives the best fit; and transmitter means to transmit the video signal from the first source, and to transmit the said vectors as difference information indicating how the first signal needs to be changed to form a display containing depth;

and a receiver, the improvement wherein the receiver comprises:

a display capable of providing an illusion of depth;

input means for receiving the transmitted first video signal and for receiving the transmitted difference information indicating how the first video signal needs to be changed to form a display containing depth;

means for modifying the received first video signal with the difference information to form a second video signal; and means for supplying the first and second video signals to the display.

12. A receiver according to claim 11, in which the display is a stereoscopic display.

13. A receiver according to claim 11, in which the display is a holographic display.

* * * * *